(12) United States Patent
Le Tohic

(10) Patent No.: US 10,737,555 B2
(45) Date of Patent: Aug. 11, 2020

(54) AIR VENT

(71) Applicant: Illinois Tool Works Inc., Glenview, IL (US)

(72) Inventor: Laurent Le Tohic, Enkenbach-Alsenborn (DE)

(73) Assignee: Illinois Tool Works Inc., Glenview, IL (US)

( * ) Notice: Subject to any disclaimer, the term of this patent is extended or adjusted under 35 U.S.C. 154(b) by 218 days.

(21) Appl. No.: 15/959,726

(22) Filed: Apr. 23, 2018

(65) Prior Publication Data

US 2018/0312042 A1 Nov. 1, 2018

(30) Foreign Application Priority Data

Apr. 27, 2017 (DE) .......................... 10 2017 109 057

(51) Int. Cl.
*B60H 1/34* (2006.01)

(52) U.S. Cl.
CPC ... *B60H 1/3421* (2013.01); *B60H 2001/3471* (2013.01)

(58) Field of Classification Search
CPC .................. B60H 1/3421; B60H 2001/3471
USPC ....................................................... 454/155
See application file for complete search history.

(56) References Cited

U.S. PATENT DOCUMENTS

2009/0286462 A1\* 11/2009 Goto .................... B60H 1/3428
454/155
2019/0193526 A1\* 6/2019 Stark .................... B60H 1/3421

FOREIGN PATENT DOCUMENTS

| DE | 202005018642 U1 | 2/2006 |
| DE | 202009011085 U1 | 2/2010 |
| DE | 202010000979 U1 | 4/2010 |
| DE | 202012100980 U1 | 5/2012 |

\* cited by examiner

*Primary Examiner* — Edelmira Bosques
*Assistant Examiner* — Allen R Schult
(74) *Attorney, Agent, or Firm* — Quarles & Brady LLP

(57) ABSTRACT

Air vent for a vehicle includes a frame-shaped housing, in which a plurality of air guide elements are arranged, wherein first air guide elements are each mounted in a manner allowing pivot movement about a first pivot axis, and wherein second air guide elements are each mounted in a manner allowing pivot movement about a second pivot axis, wherein the first pivot axes extend perpendicular to the second pivot axes, further comprising a manually operable operating element for pivoting the air guide elements, wherein first guide rails are provided, along which the operating element for pivoting the first air guide elements about the first pivot axes is displaceable along a first direction of displacement, and wherein second guide rails are provided, along which the operating element for pivoting the second air guide elements about the second pivot axes is displaceable along a second direction of displacement.

15 Claims, 4 Drawing Sheets

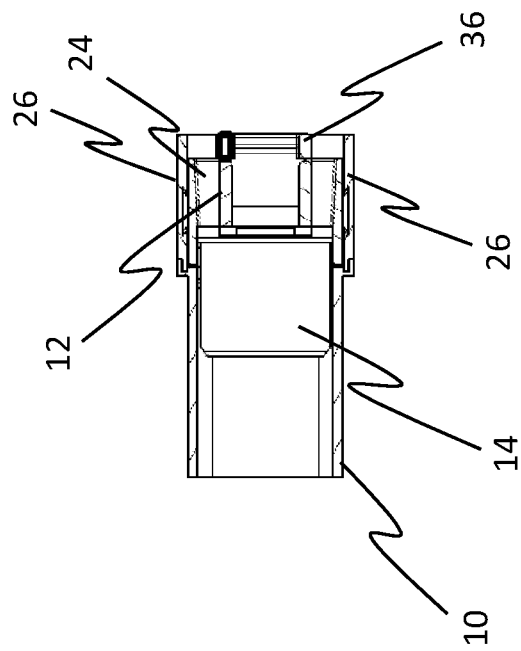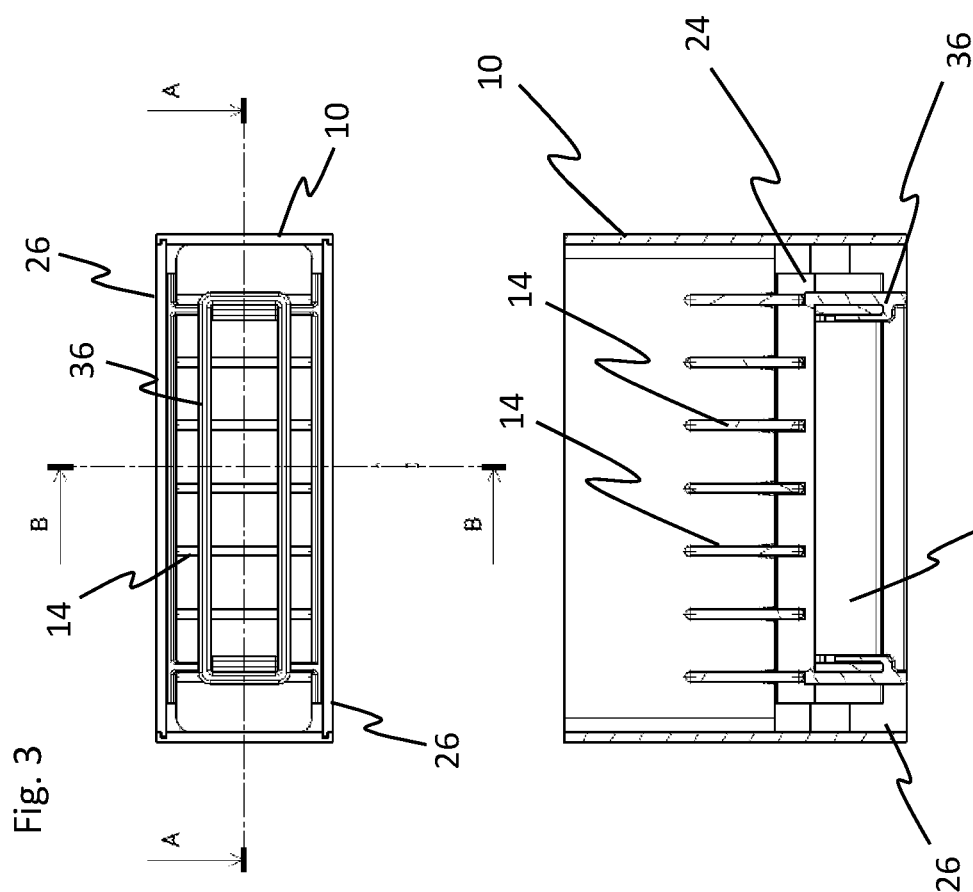

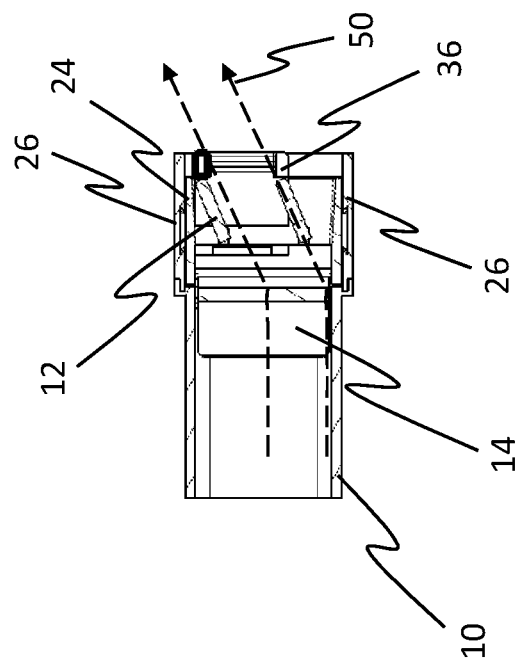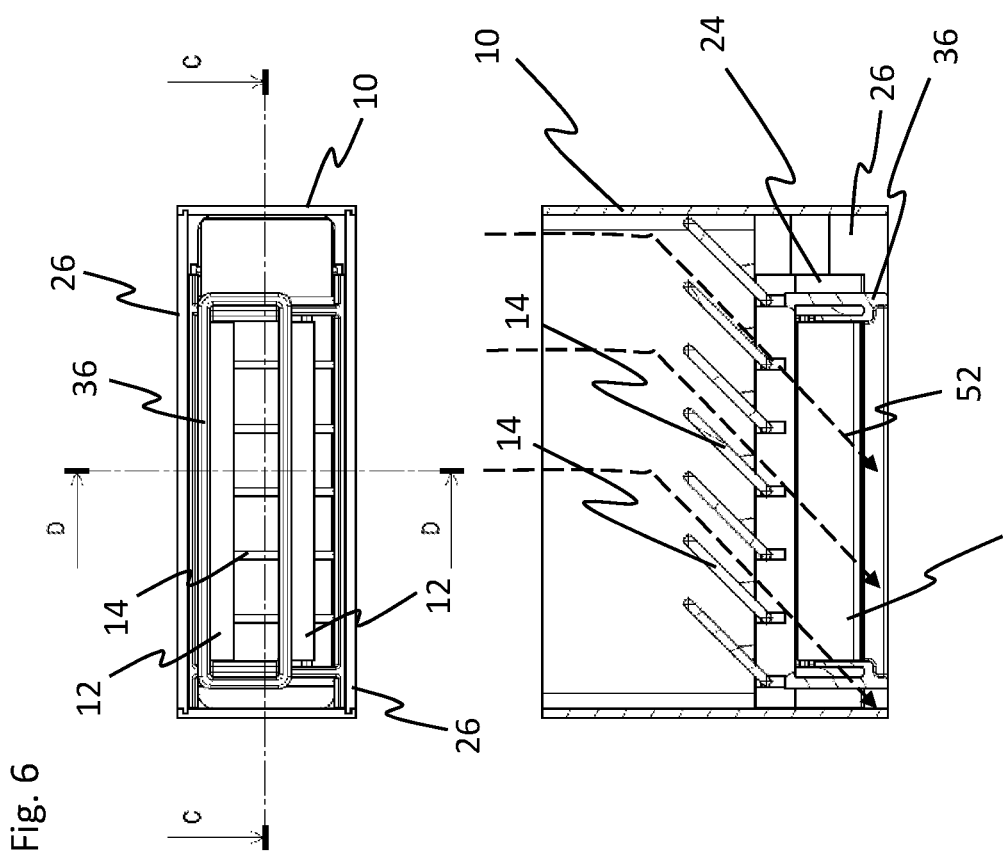

AIR VENT

RELATED APPLICATIONS

The present application claims priority to German Patent Application No. 10 2017 109 057.6, entitled "Air Vent," which was filed on Apr. 27, 2017 and which is incorporated herein by reference in its entirety.

FIELD OF EMBODIMENTS OF THE DISCLOSURE

Embodiments relates to an air vent for a vehicle, comprising a frame-shaped housing, in which a plurality of air guide elements are arranged, wherein first air guide elements are each mounted in a manner allowing pivot movement about a first pivot axis, and wherein second air guide elements are each mounted in a manner allowing pivot movement about a second pivot axis, wherein the first pivot axes extend perpendicular to the second pivot axes, further comprising a manually operable operating element for pivoting the air guide elements.

BACKGROUND

Such air vents are used to ventilate the interior of vehicles, for example, passenger cars or trucks. They have a plurality of air guide elements, which can be adjusted, for example, pivoted, by means of an operating element. First air guide elements can each be pivoted about a first pivot axis; and second air guide elements can each be pivoted about a second pivot axis. The air guide elements can be pivoted by means of an operating element; and, thus, the direction of flow of the air into the interior of the vehicle can be set.

Such an air vent is known, for example, from the document DE 20 2010 000 979 U1. In this case a common operating element is arranged on an air guide lamella and can be pivoted, together with the air guide lamella, about a horizontal axis. By means of suitable coupling elements it is ensured that all of the air guide lamellae, which can be pivoted about a horizontal axis, are also pivoted. In addition, the operating element can be moved laterally in the horizontal direction, as a result of which second lamellae, which are coupled by means of a connecting element, are each pivoted about a vertical axis. Thus, it is possible to control all of the lamellae with only one operating element. However, the coupling requires very sophisticated kinematic elements, for example, coupling elements. Furthermore, these coupling elements are visible from the vehicle interior, a feature that which may be undesirable. Even the orientation of the operating element changes as a function of the position of the lamellae, an aspect that may also be undesirable, in particular, for reasons relating to the visual appearance.

Furthermore, air vents are known from the documents DE 20 2009 011 085 U1, DE 20 2005 018 642 U1 and DE 20 2012 100 980 U1. These air vents have sophisticated operating and adjusting mechanisms.

SUMMARY OF EMBODIMENTS OF THE DISCLOSURE

One or more embodiments may provide an air vent of the type that is mentioned above and that allows all of the air guide elements to be operated with only one operating element. In certain embodiments, the air guide elements may be operated in a relatively simple manner. In certain embodiments, the air guide elements may exhibit an appearance that is relatively unobtrusive.

For an air vent of the type mentioned above, one or more embodiments may be achieved by providing first guide rails and second guide rails. The first guide rails may be operably coupled to an operating element, wherein the operating element is displaceable along the first guide rails in a first direction for pivoting the first air guide elements about the first pivot axes. The second guide rails may be operably coupled to the operating element, wherein the operating element is displaceable along the second guide rails in a second direction for pivoting the second air guide elements about the second pivot axes.

The air vent may be used to ventilate the interior of vehicles, for example, a passenger car or a truck. Said air vent comprises a housing, which can be inserted into an opening of a vehicle and in which a plurality of air guide elements are arranged. In this case first air guide elements are each mounted in a manner allowing pivot movement about a first pivot axis, and second air guide elements are each mounted in a manner allowing pivot movement about a second pivot axis. The first pivot axes of the first air guide elements run parallel to each other; and the second pivot axes of the second air guide elements also run parallel to each other. The first pivot axes extend perpendicular to the second pivot axes. The first and second air guide elements are arranged one behind the other in the direction of flow of the air through the air vent.

A common operating element is provided in order to pivot the first and second air guide elements. The operating element is preferably also arranged in the housing. Even more preferably, the operating element does not protrude out of the housing. The housing may be designed in the shape of a frame. In some embodiments, the operating element is translationally displaced along the first or second direction of displacement. The first and second directions of displacement extend, in particular, perpendicular to each other. Due to the translational movement of the operating element, the air guide elements are pivoted about the first or second pivot axes. In particular, one exclusively translational movement of the operating element takes place. In particular, there is no change in the orientation of the operating element. Therefore, the directions of displacement of the operating element are two dimensionally in one plane. In some embodiments, there is no need for another operating element in addition to the manual operating element, in order to adjust the air guide elements. In particular, no additional operating elements may be necessary in the air flow or outside the housing. Since, the orientation of the operating element does not change as it moves along the first direction or the second direction of displacement, in particular, no pivoting movement of the operating element ensues, the visual appearance of the air vent hardly changes in the course of setting the air guide elements. Only the position of the operating element changes. The net result is an unobtrusive appearance and negligible impact on the air flow due to the operating element. The air vent may be easy to produce and assemble. In addition, the operating element and the air guide elements may be used with smaller air vents.

The operating element may be designed in the shape of a frame. This aspect further minimizes any effect that the operating element may have on the air flow.

According to an additional embodiment, a guide frame having a rectangular basic shape is disposed in the housing. Then the operating element can be mounted on the guide frame in a manner allowing displacement along the first direction of displacement along the transverse sides of the guide frame, where said transverse sides form the first guide rails. As a result, the first direction of movement of the operating element is specified in a particularly simple way with minimum impact on the air flow.

The operating element can be mounted by means of a latching connection on the guide frame in a manner allowing displacement. The result is an extremely easy assembly. In order to engage, it is possible, for example, that the vertical side walls of the operating element, which is, for example, in the shape of a frame, may engage in a latching manner behind the transverse sides of the guide frame. For this purpose latching projections may be provided, for example, on the free ends of the vertical side walls of the operating element. In this way the operating element is held on the guide frame in a detachable manner and at the same time can be displaced along the transverse sides of the guide frame.

The guide frame can be mounted with its longitudinal sides on the second guide rails in a manner allowing displacement along the second direction of displacement. Consequently in this embodiment the operating element is displaced, i.e., together with the guide frame, along the second guide rails in the second direction of displacement.

The second guide rails may be arranged on the housing. In this case the second guide rails may be integrally connected to the housing. However, said second guide rails are formed preferably separately from the housing and are attached, in particular, detachably attached, to said housing. The second guide rails may be slid, for example, with their ends into a respective receiving groove of the housing. The net result is an extremely easy assembly. The receiving grooves may be formed on the opposite inner walls of the housing, in each case on the respective upper and lower end of the walls. For this purpose the second guide rails may exhibit on their end faces projections, with which they are slid into the receiving grooves. The second guide rails may form a part of an upper and lower wall of the housing of the air vent.

According to an especially practical example of the embodiment, the first and second air guide elements may be first and second air guide lamellae. Then it may also be provided that the first air guide lamellae are pivotably held with their front side on the operating element and are pivotably held with their rear side on the guide frame, preferably on the transverse sides of the guide frame.

Moreover, it can be provided that the second air guide lamellae are pivotably held with their front side on the guide frame, preferably on the longitudinal sides of the guide frame and, furthermore, are pivotably held on the housing of the air vent. The second air guide lamellae may be pivotably mounted, for example, centrally on the housing.

Owing to the aforementioned embodiments where, on the one hand, the first air guide lamellae are mounted on the operating element and, on the other hand, on the guide frame and where, on the one hand, the second air guide lamellae are mounted on the guide frame and, on the other hand, on the housing, it is possible to dispense with mechanical coupling elements, for example, coupling rods or the like. As a result, an especially clean and unobtrusive appearance is achieved; and the effect on the air flow is further minimized.

According to an especially practical example of the embodiment, the pivotable mounting of the first and/or second air guide elements can be achieved in each case by means of pivot pins, each mounted in a pin receptacle. For example, pivot pins may be formed on the first and second air guide lamellae; and these pivot pins are held in corresponding pin receptacles on the operating element or the guide frame or the housing.

According to another embodiment the first pivot axes of the first air guide elements may extend perpendicular to the first direction of displacement of the operating element; and the second pivot axes of the second air guide elements may extend perpendicular to the second direction of displacement of the operating element.

BRIEF DESCRIPTION OF THE DRAWINGS

One exemplary embodiment is explained in more detail below with reference to the figures. The drawings show in schematic form:

FIG. 3 illustrates a view from the front of the air vent, shown in FIG. 1, in a first operating position;

FIG. 4 illustrates a sectional view along the line B-B in FIG. 3;

FIG. 5 illustrates a sectional view along the line A-A in FIG. 3;

FIG. 6 illustrates a view from the front of the air vent, shown in FIG. 1, in a second operating position;

FIG. 7 illustrates a sectional view along the line D-D in FIG. 6; and

FIG. 8 illustrates a sectional view along the line C-C in FIG. 6.

Unless stated otherwise, identical reference numerals in the figures denote identical objects.

DETAILED DESCRIPTION OF EMBODIMENTS OF THE DISCLOSURE

Figure 1:
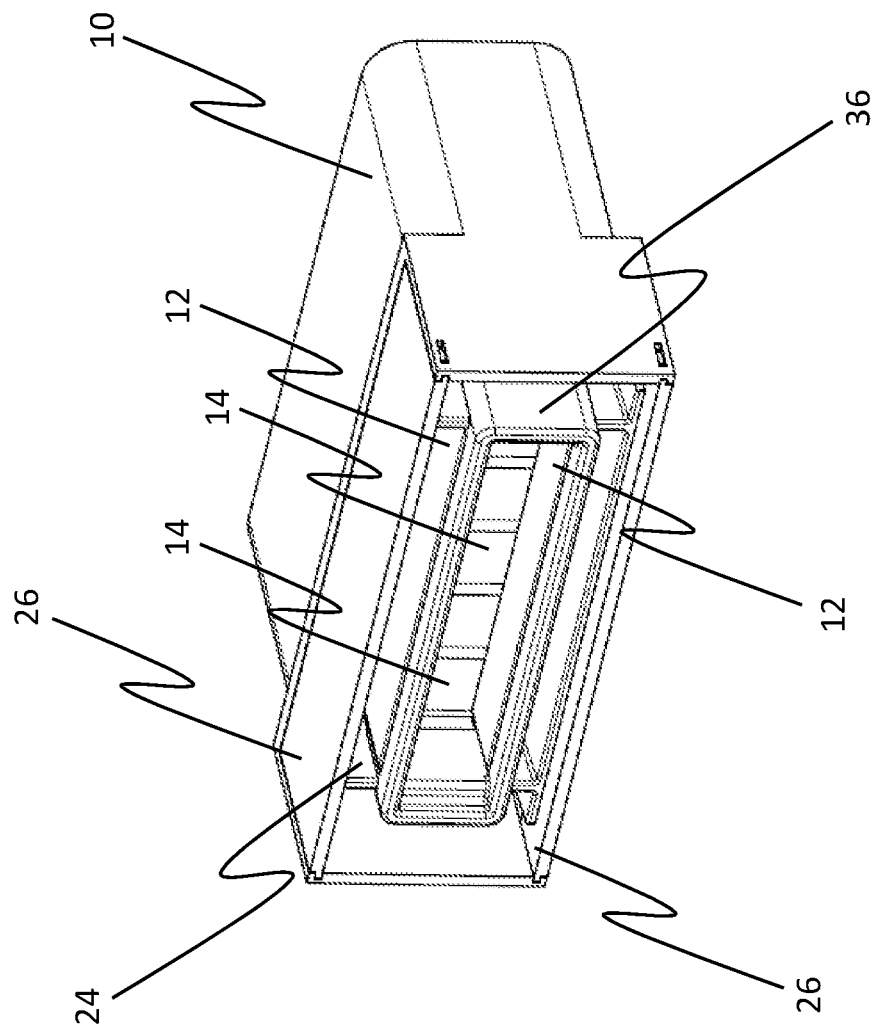
FIG. 1 illustrates an air vent in a perspective view in accordance with at least one embodiment.

In some embodiments, the air vent includes a frame-shaped housing 10, which can be inserted into a corresponding opening of a vehicle, for example, a passenger car or a truck, for ventilating the interior of vehicles. First air guide elements 12 (in the illustrated example two first air guide elements 12) and second air guide elements 14 (in the illustrated example seven second air guide elements 14) are pivotably mounted in the housing 10. It goes without saying that the number of the first air guide elements 12 and the second air guide elements 14 can also be selected differently. The first air guide elements 12 are each mounted in a manner allowing pivot movement about a first pivot axis; and the second air guide elements 14 are each mounted in a manner allowing pivot movement about a second pivot axis. The first pivot axes of the first air guide elements 12 run parallel to each other; and the second pivot axes of the second air guide elements 14 run parallel to each other. In addition, the first pivot axes of the first air guide elements 12 extend perpendicular to the second pivot axes of the second air guide elements 14. In the illustrated example the first and second air guide elements 12, 14 are air guide lamellae 12, 14. In the assembled state in a vehicle the first pivot axes may extend, for example, horizontally; and the second pivot axes may extend vertically.

On their opposite transverse edges the first air guide elements 12 have in each case first pivot pins 16, which lie opposite on the rear side and which define the first pivot axes. The second air guide elements 14 also have on their opposite transverse edges in each case first pivot pins 18, which lie opposite approximately in the center and which define the second pivot axes. In addition, opposite second pivot pins 20 are formed on the front side of the transverse edges of the first air guide elements 12. Correspondingly, second pivot pins 22, lying opposite on the front side, are formed on the transverse sides of the second air guide elements 14.

Furthermore, the air vent comprises a guide frame 24 having a rectangular basic shape and second guide rails 26, which have in each case projections 28 on their transverse edges. On the opposite inner walls of the housing 10, said inner walls being, for example, vertical in the assembled state, upper and lower receiving grooves 30 are formed on the inside; and the second guide rails 26 are slid with their projections 28 into said receiving grooves. The second guide rails 26 have in each case centrally a rail receptacle 32, which extends in the longitudinal direction of the second guide rails 26. The guide frame 24 respectively has on the outer sides of its longitudinal sides two guide projections 34, with which the guide frame 24 in the assembled state is mounted in a manner allowing longitudinal displacement in the rail receptacles 32 of the second guide rails 26.

Figure 2:
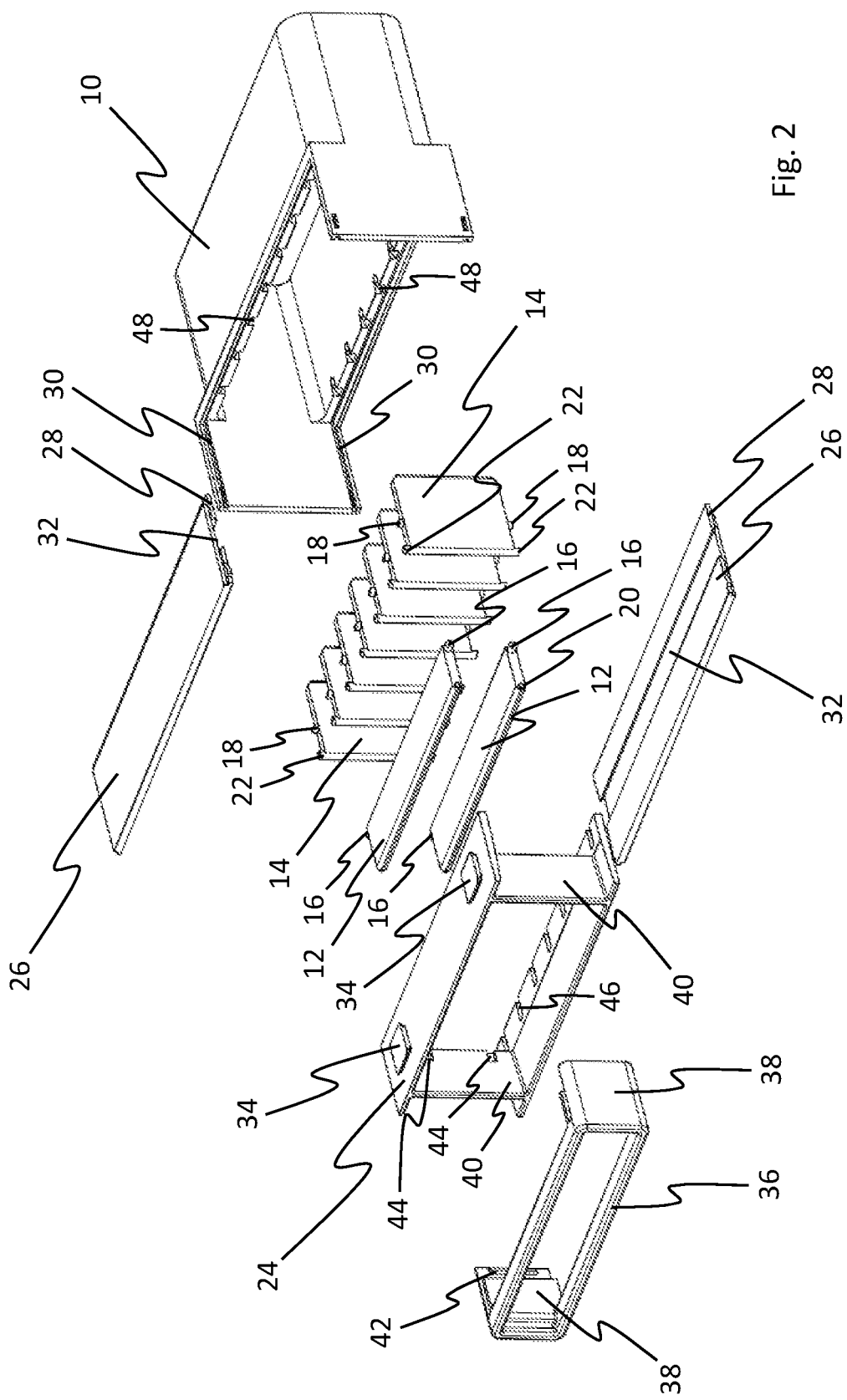
FIG. 2 illustrates the air vent from FIG. 1 in an exploded view.

In addition, the air vent comprises a frame-shaped operating element 36, which also has a rectangular basic shape. In the assembled state the opposite side walls 38 of the operating element 36 engage at the transverse sides 40 of the guide frame 24 in such a way that the operating element 36 is mounted on the transverse sides 40 in a manner allowing displacement in the direction of the transverse sides, i.e., in FIG. 2 from top to bottom and vice versa. For this purpose latching projections 42, provided on the free ends of the walls 38, engage behind the transverse sides 40. As a result, the transverse sides 40 of the guide frame 24 form first guide rails. The direction of movement of the operating element 36 on the guide frame 24 forms a first direction of displacement of the operating element 36. The direction of movement of the guide frame 24 with the operating element 36 in the second guide rails 26 forms a second direction of displacement of the operating element 36.

On the rear sides of the transverse sides 40 of the guide frame 24, where said rear sides face away from the vehicle interior in the assembled state, there are in each case upper and lower pin receptacles 44, in which each one of the first pivot pins 16 of the first air guide elements 12 is received. The second pivot pins 20 of the first air guide elements 12 are in each case received in upper and lower pin receptacles (which cannot be seen in more detail in FIG. 2) on the rear side (covered in FIG. 2) of the operating element 36. A displacement of the operating element 36 in the first direction of displacement along the transverse sides 40 of the guide frame 24 leads correspondingly to the first air guide elements 12 being pivoted about the first pivot axes, defined by the first pivot pins 16. On the rear sides of the longitudinal sides of the guide frame 24, where said rear sides face away from the vehicle interior in the assembled state, there are additional upper and lower pin receptacles 46, in which in the assembled state each one of the second pivot pins 22 of the second air guide elements 14 is received. In addition, additional upper and lower pin receptacles 48 are formed on the housing 10; and in the assembled state each one of the first pivot pins 18 of the second air guide elements 14 is received in said housing. A movement of the operating element 36 and, thus, the guide frame 24 along the second direction of displacement in the second guide rails 26 leads correspondingly to the second air guide elements 14 being pivoted about the second pivot axes.

FIGS. 3 to 5 show a first operating position, in which the operating element 36 with respect to the first direction of displacement and the second direction of displacement is located respectively in a central starting position. In this starting position in the assembled state the first air guide elements 12 are arranged, for example, horizontally; and the second air guide elements 14, vertically.

In the second operating position, shown in FIGS. 6 to 8, the operating element 36 has been moved upwards along the first direction of displacement and to the left along the second direction of displacement in the frontal view of FIG. 6. Correspondingly, on the one hand, the first air guide elements 12 have been pivoted upwards about the first pivot axes, so that air, flowing through the air vent, flows upwards, as illustrated in FIG. 7 by the arrows 50. Furthermore, the second air guide elements 14 have been pivoted about the second pivot axes, so that air flows out laterally, as shown in FIG. 8 by the arrows 52.

Between the operating positions shown in FIGS. 3 to 5, on the one hand, and in FIGS. 6 to 8, on the other hand, the operating element 36 has been displaced only translationally along the first and second direction of displacement. A change in the orientation of the operating element 36 does not take place. Instead, owing to the displacement along the first or second direction of displacement, a pivot movement of the first and second air guide elements 12, 14 can take place in both pivot directions. In addition, owing to the mounting of the first and second air guide elements 12, 14, it is possible to dispense with separate coupling elements or other kinematic elements.

It goes without saying that in addition to the elements shown in the figures, a closing flap can also be provided, with which the air vent can be completely closed. This closing flap can be operated, for example, by means of an additional operating element (not illustrated) or also by means of the operating element 36. This is not essential.

LIST OF REFERENCE NUMERALS

10 housing
12 first air guide element
14 second air guide element
16 pivot pin
18 pivot pin
20 pivot pin
22 pivot pin
24 guide frame
26 second guide rails
28 projections
30 receiving grooves
32 rail receptacle
34 guide projections
36 operating element
38 side walls
40 transverse sides
42 latching projections
44 pin receptacles
46 pin receptacles
48 pin receptacles
50 arrows
52 arrows

What is claimed is:
1. An air vent for a vehicle, comprising:
a housing defining a first air passage;
a plurality of air guide lamellae disposed in the first air passage, the air guide lamellae including first air guide lamellae and second air guide lamellae, wherein
each of the first air guide lamellae are pivotable about a respective first pivot axis, each of the second air guide lamellae are pivotable about a respective second pivot axis, and the first pivot axes extend perpendicular to the second pivot axes; and a manual operating slider disposed in the first air passage and operably coupled to the plurality of air guide lamellae for pivoting the air guide lamellae, wherein the manual operating slider defines a second air passage, the manual operating slider is slidably translatable relative to the housing in a first direction for pivoting the first air guide lamellae about the first pivot axes, and the manual operating slider is slidably translatable relative to the housing in a second direction for pivoting the second air guide lamellae about the second pivot axes.

2. The air vent of claim 1, wherein the manual operating slider is rectangular.

3. The air vent of claim 1, further comprising a guide frame disposed in the first air passage, the manual operating slider being slidably engaged with the guide frame to slidably translate in the first direction.

4. The air vent of claim 3, wherein the guide frame includes transverse sides, the transverse sides being slidably engaged with the manual operating slider.

5. The air vent of claim 3, wherein the manual operating slider is slidably secured to the guide frame via a latching connection.

6. The air vent of claim 3, wherein:

the guide frame has upper and lower longitudinal sides, and the guide frame is slidably translatable relative to the housing in the second direction via the upper and lower longitudinal sides.

7. The air vent of claim 6, further comprising upper and lower guide rails connected to the housing and further defining the first air passage, wherein:

the upper guide rail is slidably engaged with the upper longitudinal side, and the lower guide rail is slidably engaged with the lower longitudinal side.

8. The air vent of claim 7, wherein the upper and lower guide rails are each inserted into a receiving groove of the housing.

9. The air vent of claim 3, wherein the second air guide lamellae are pivotably engaged with the housing and with the guide frame.

10. The air vent of claim 3, wherein the first air guide lamellae have front sides that are pivotably held by the manual operating slider and rear sides that are pivotably held by the guide frame.

11. The air vent of claim 10, wherein the rear sides are pivotably held by opposing transverse sides of the guide frame.

12. The air vent of claim 3, wherein:

the second air guide lamellae have front sides and rear sides, and the rear sides are pivotably held by the housing.

13. The air vent of claim 12, wherein the front sides are pivotably held by longitudinal sides of the guide frame.

14. The air vent of claim 1, wherein the air guide lamellae have pivot pins mounted within respective pin receptacles.

15. The air vent of claim 1, wherein:

the first pivot axes of the first air guide lamellae extend perpendicular to the first direction, and the second pivot axes of the second air guide lamellae extend perpendicular to the second direction.

* * * * *